United States Patent
Schwartz

(10) Patent No.: US 11,115,368 B2
(45) Date of Patent: Sep. 7, 2021

(54) SYSTEMS AND METHODS FOR INTELLIGENT APPLICATION NOTIFICATION MANAGEMENT

(71) Applicant: Life360, Inc., San Francisco, CA (US)

(72) Inventor: Jacob Schwartz, San Francisco, CA (US)

(73) Assignee: Life360, Inc., San Francisco, CA (US)

( * ) Notice: Subject to any disclaimer, the term of this patent is extended or adjusted under 35 U.S.C. 154(b) by 287 days.

(21) Appl. No.: 15/584,592

(22) Filed: May 2, 2017

(65) Prior Publication Data

US 2018/0324122 A1 Nov. 8, 2018

(51) Int. Cl.
*H04L 12/58* (2006.01)
*G06F 9/54* (2006.01)
*G06Q 10/10* (2012.01)

(52) U.S. Cl.
CPC .............. *H04L 51/24* (2013.01); *G06F 9/54* (2013.01); *G06F 9/542* (2013.01); *G06F 9/546* (2013.01); *G06Q 10/10* (2013.01); *H04L 51/04* (2013.01)

(58) Field of Classification Search
CPC ....... H04L 51/24; H04L 51/063; H04L 51/04; G06F 9/546; G06F 9/542; G06F 9/54; G06Q 10/10
See application file for complete search history.

(56) References Cited

U.S. PATENT DOCUMENTS

| | | | |
|---|---|---|---|
| 5,721,825 A * | 2/1998 | Lawson | G06F 9/542 709/203 |
| 8,996,997 B2 | 3/2015 | Xu | |
| 9,462,570 B1 | 10/2016 | Bostic et al. | |
| 9,471,199 B2 | 10/2016 | Vander Veen et al. | |
| 9,473,428 B1 | 10/2016 | Koum et al. | |
| 9,488,980 B2 | 11/2016 | Haberl et al. | |

(Continued)

OTHER PUBLICATIONS

Notifications | Android Developers, developer.android.com, "https://developer.android.com/guide/topics/ui/notifiers/notifications.html", last accessed: May 2, 2017.

(Continued)

*Primary Examiner* — Doon Y Chow
*Assistant Examiner* — Carina Yun
(74) *Attorney, Agent, or Firm* — Womble Bond Dickinson (US) LLP

(57) ABSTRACT

Intelligent application notification management is provided. A state machine on a communication device is used to retain, sequence, and handle notifications included in a notification queue. It is determined whether a new notification has been received and whether the new notification can be added to a notification queue based on a maximum number of notifications. It may be determined whether the new notification is a duplicate of an existing notification in the notification queue. Notifications in the queue may be combined, reordered, and altered. The notification queue may be modified based on one or more of the following: an attribute, user input, user preference, a system state, or whether an application to which the notification is related is currently active. The notification management system may therefore decide which of the notifications to display and when to display them, such that notifications are presented logically and a user is not overwhelmed.

27 Claims, 5 Drawing Sheets

(56) References Cited

U.S. PATENT DOCUMENTS

| | | | |
|---|---|---|---|
| 2008/0126441 A1* | 5/2008 | Giampaolo | G06F 11/1461 |
| 2009/0131166 A1* | 5/2009 | Smith | A63F 13/44 |
| | | | 463/31 |
| 2010/0134824 A1* | 6/2010 | Ferlitsch | H04N 1/00408 |
| | | | 358/1.15 |
| 2013/0111356 A1 | 5/2013 | Vasudevan et al. | |
| 2014/0057606 A1 | 2/2014 | Kunjithapatham et al. | |
| 2014/0189030 A1* | 7/2014 | Benchenaa | H04L 51/24 |
| | | | 709/207 |
| 2014/0258521 A1* | 9/2014 | English | G06F 9/5083 |
| | | | 709/224 |
| 2015/0020080 A1* | 1/2015 | Simsek | G06F 9/546 |
| | | | 719/314 |
| 2015/0127716 A1* | 5/2015 | Agrawal | H04L 67/04 |
| | | | 709/203 |
| 2016/0065524 A1 | 3/2016 | Umapathy et al. | |
| 2016/0065527 A1 | 3/2016 | Umapathy et al. | |
| 2016/0260031 A1* | 9/2016 | Pace | G06Q 20/1235 |
| 2017/0118304 A1* | 4/2017 | Ratiu | H04L 67/26 |
| 2018/0121035 A1* | 5/2018 | Filippi | G06F 3/04847 |

OTHER PUBLICATIONS

Notifications, Apple Inc., "https://developer.apple.com/notifications/", last accessed: May 2, 2017.

\* cited by examiner

SYSTEMS AND METHODS FOR INTELLIGENT APPLICATION NOTIFICATION MANAGEMENT

FIELD

Embodiments herein relate generally to systems and methods for providing notifications to a user of a communication device.

BACKGROUND

Currently, communication devices such as mobile devices and smart mobile phones include numerous applications for social media, networking, instant messaging, and multimedia sharing, among other things. Users are therefore inundated with notifications from these various applications.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

In the following description, numerous specific details are set forth. However, it is understood that embodiments may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

Figure 1:
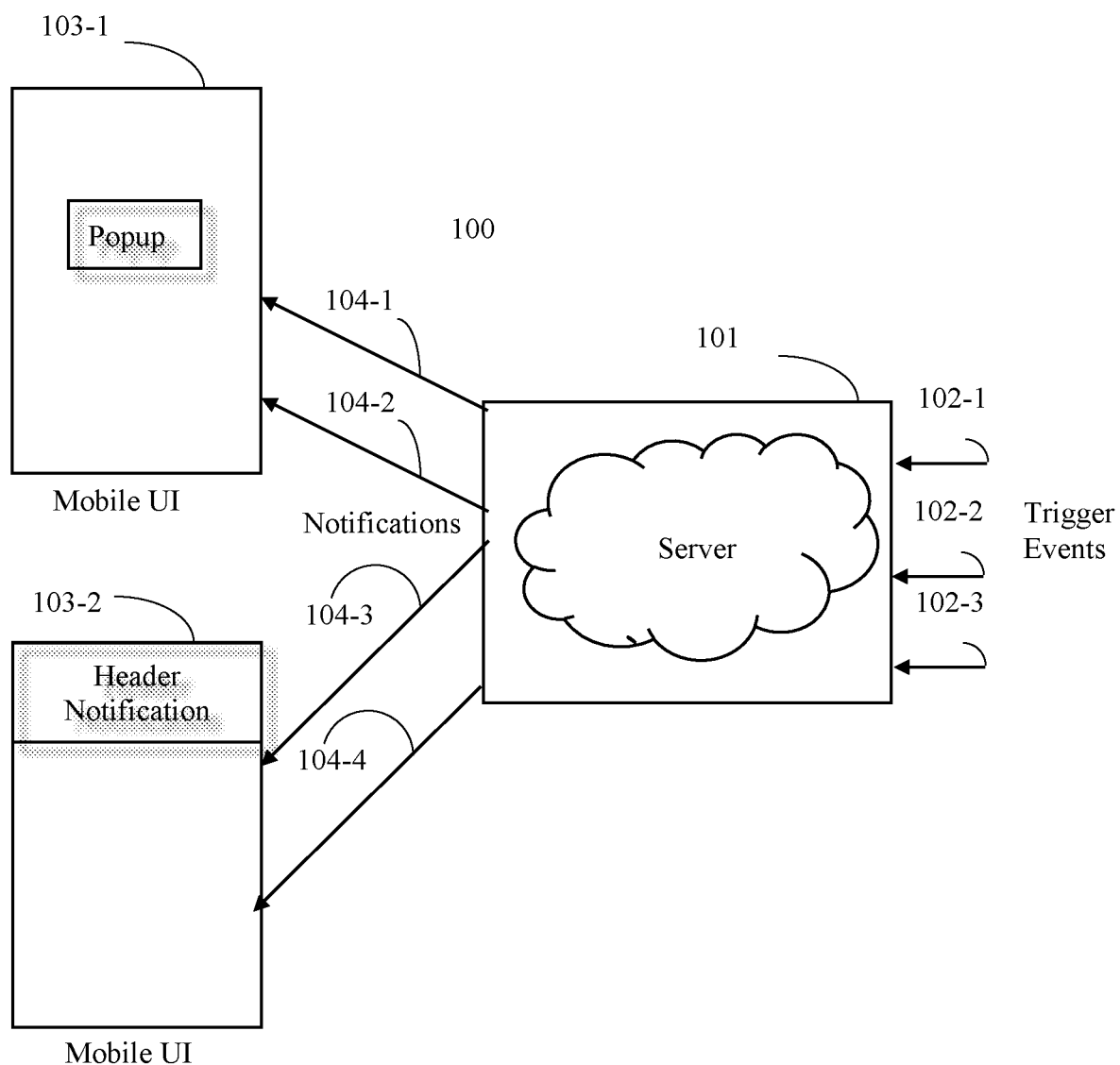
FIG. 1 illustrates a prior art system for displaying a notification on a mobile device.

One conventional example of a system displaying notifications to a user of a communication device is illustrated in FIG. 1 as system 100. Typically, notifications are generated by the server 101. A number of inputs 102-1, 102-2 102-3 can trigger notifications sent to mobile clients 103 (referred to individually as mobile clients 103-1 and 103-2) to be displayed to the user. These triggers may include, for example, input indicating: a new post on a social networking site, a comment or response to a post on a social networking site, a message on an instant messaging (IM) application or sharing of a photo or other multimedia, etc. Notifications 104-1, 104-2, 104-3, 104-4 are transmitted to the mobile clients 103 via various delivery mechanisms such as mobile networks (e.g., 4G, LTE, etc.) and Wi-Fi etc. Delivery of the notifications can be sequential and potentially simultaneous. FIG. 1 illustrates example notifications that may be displayed by mobile clients 103-1 and 103-2. In particular, mobile client 103-1 illustrates an example in which a notification is displayed as a pop-up notification, and mobile client 103-2 illustrates an example in which a notification is displayed as a header notification. Typically, users can either turn off notifications or control how the notifications are displayed (e.g., priority, header, pop-up, or lock-screen display, etc.). In some cases, notifications can be grouped logically before being displayed to the user. However, with the limited options available to the user, the inventors herein have recognized that notifications may interfere with each other and potentially overwhelm the user.

Referring still to system 100 of FIG. 1, communication between server 101 and remote mobile clients 103 is generated due to transmission of notifications generated by server 101 for remote display on mobile clients 103 and user actions on mobile clients 103 (e.g., dismissing a notification), among other things. However, since server 101 often generates and transmits a large number of notifications, the server needs resources to support a large computational load. The inventors herein have recognized that even a small reduction (e.g., 10% reduction) in communication traffic between server 101 and mobile clients 103 for controlling display of notifications may lead to a significant reduction in resources needed to meet the computational requirements for communication.

Embodiments herein provide systems and methods for intelligent application notification management. According to one aspect, a state-machine on a communication device is used to retain, sequence and handle notifications. The state machine may be optimized to provide the user notifications in an intelligent and logical manner, such that the user is not overwhelmed. The state machine may also provide intelligent filtering of the notifications. The display of notifications may therefore be modulated. According to another aspect, notification management is provided locally on a communication device without approval by the main server, such that the computational requirements of the server are offloaded (i.e., computation load of the server is reduced) and the load on the communication system is reduced (i.e., the communication load on the network is reduced).

As used herein, a communication device may be any device capable of displaying a notification and optionally receiving an external notification. For example, a communication device may be a mobile device, a cell phone, a media player, a personal data organizer, a wearable device, a personal computer, a portable computer, a handheld computer, a tablet computer, a laptop, a notebook, a vehicle, etc. A notification refers to a particular parcel of information to be displayed by a communication device to a user.

Figure 2:
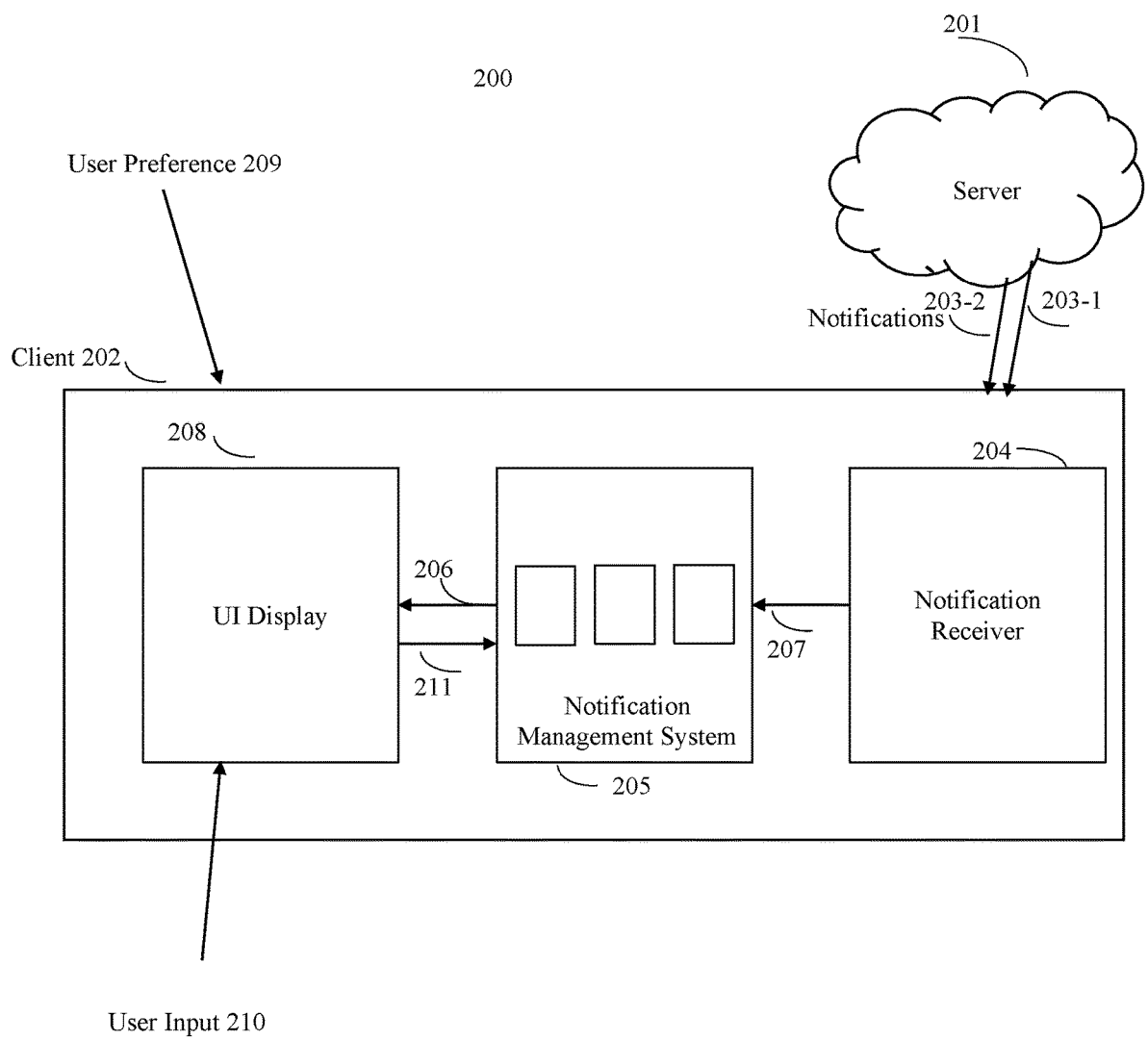
FIG. 2 illustrates a block diagram for explaining a notification management system according to one example embodiment.

FIG. 2 illustrates a block diagram for explaining an intelligent application notification management system (IANS) 200 according to one example embodiment. The IANS may be implemented by hardware, software, etc. or any combination thereof, required on the device to retain, sequence, handle, and display appropriate notifications to the user. In one embodiment, a notification management system 205 is included in a communication device (e.g., client device 202) that may include hardware such as one or more processors and one or more memories (not shown), as well as a notification receiver 204 for receiving notifications and user interface (UI) display 208 to display notifications as shared resources. The notification management system 205 can also be implemented, using hardware such as FPGA, ASIC, and/or other custom hardware logic, as added capabilities.

As shown in FIG. 2, client device 202 receives as user input 210 and user preferences 209. Client device 202 also receives as input notifications 203-1, 203-2 that are generated by server 201, by other clients or by external events not shown in FIG. 2. As one example, an external event may be user input of a pre-defined location (e.g., a home, office, school). Notifications 203-1 and 203-2 may be delivered via a mobile network, a wireless network, a wired network, by a sensor connected to client 202, or by any other suitable means. Notifications 203-1 and 203-2 may be received by a receiver, such as notification receiver 204, which may be implemented by a network receiver.

In one embodiment, client device 202 determines how to intelligently filter, combine, and/or alter notifications 203-1, 203-2 and determines when to display the notifications 203-1, 203-2. In particular, notification receiver 204 generates one or more notification signal 207 based on received notifications 203-1, 203-2 and sends notification signals 207 as input to notification management system 205. Notification management system 205 intelligently processes the incoming notifications and sends filtered notifications 206 to the user interface (UI) display 208. The notifications may be filtered to remove redundant notifications from the notification queue, and to remove notifications that are determined to not be useful.

UI display 208 receives as input user input 210 (e.g., dismissal of a notification) and user preferences 209 (explicit or implicit) and provides this information to notification management system 205 as input signal 211. An explicit user preference is, for example, a preference to ignore notifications of a certain type or for a certain duration. An implicit user preference is, for example, a preference based on the operating environment of client device 202. For example, if the user is deemed to be driving a vehicle, this would be taken as an implicit "silence" user preference, to suppress display of notifications and prevent distracting the user.

Figure 3:
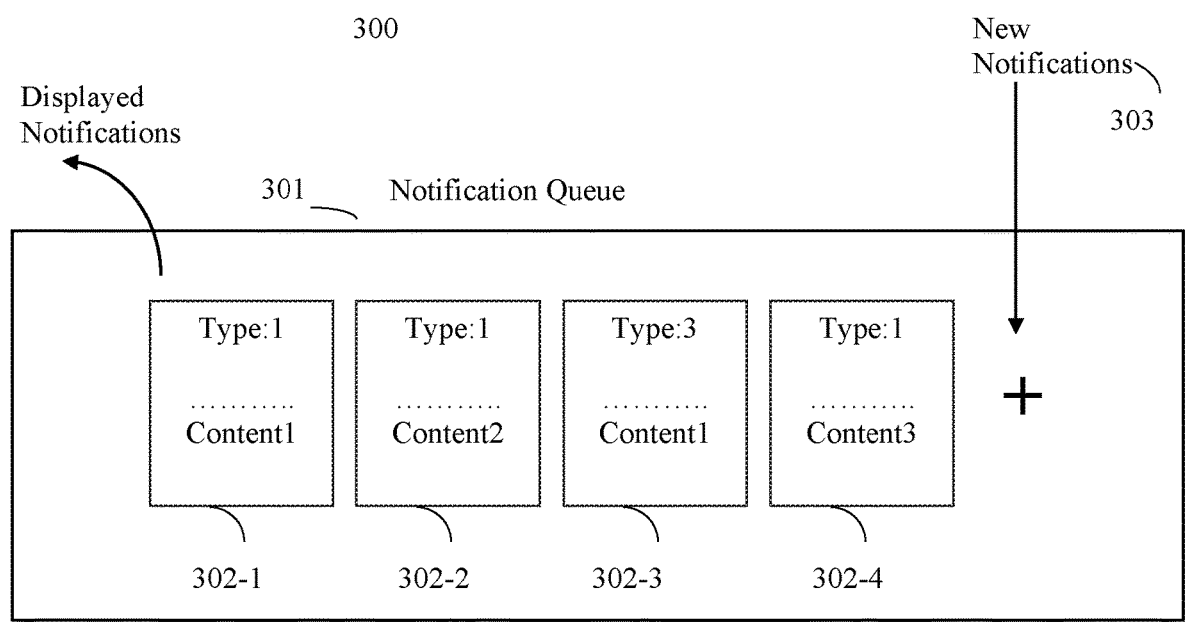
FIG. 3 illustrates a notification queue for implementing notification management according to one example embodiment.

Turning to FIG. 3, FIG. 3 illustrates an example of a notification queue 301 for implementing notification management according to one embodiment. Generally, notification queue 301 is a list of notifications (e.g., 302-1, 302-2, 302-3, 302-4) received by a notification management system that are to be displayed on a communication device. Notification queue 301 may be stored in a memory of the communication device along with other attributes specified by the IANS to allow for intelligent filtering of the notifications.

New notifications 303 that are received by the IANS are added to the notification queue 301. These notifications may be classified based on various attributes. In response to new notifications 303 being added to the notification queue 301, the IANS may combine similar notifications. Similar notifications may be, for example, notifications having the same or similar type of attribute (e.g., sender attributes, etc.). In the example of FIG. 3, two different types of notification are shown. In particular, notifications 302-1, 302-2 and 302-4 are indicated as being "Type:1" and notification 302-3 is indicated as being "Type:3". "Type:1" and "Type:3" are examples of notification types based on attribute.

In one embodiment, the IANS may modify the notification queue and reorder the notification queue based on a priority of the new notification received.

In one embodiment, the IANS decides which notifications to display based on an attribute, user preference, user input, a state of the system, and whether an application to which the notification relates is currently active.

In one embodiment, the IANS decides when to display the notifications. As one example, based on the internal state of the IANS (discussed in more detail in connection with FIG. 4), the IANS decides when to display the notification. In one embodiment, notifications of a certain type may be dismissed automatically (for example, after a certain amount of time has elapsed or other conditions have been met). Alternatively, dismissal of a notification may require input from the user. Once a notification is displayed and dismissed, the notification may be removed from the notification queue 301.

Figure 4:
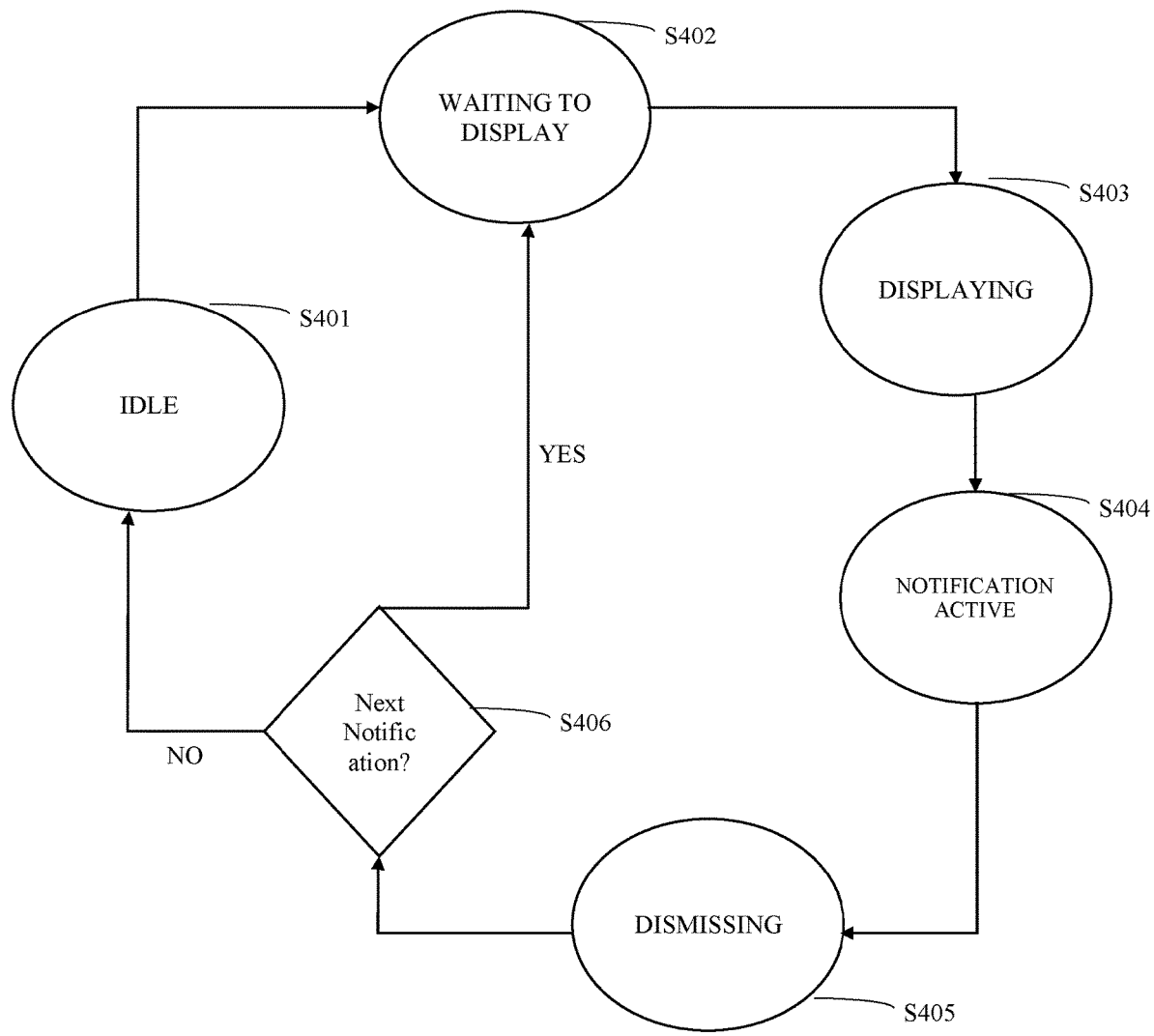
FIG. 4 illustrates a state machine for implementing notification management according to one example embodiment.

FIG. 4 illustrates a state machine that may be included in a communication device for implementing notification management according to one example embodiment. The state machine consists of the following states: IDLE, WAITING TO DISPLAY, DISPLAYING, NOTIFICATION ACTIVE, DISMISSING. In one embodiment, the IANS begins in the IDLE state S401 upon initialization. In this state, the IANS checks to see if there are any existing notifications in the notification queue (e.g., notifications 302-1, 302-2, 302-3, 302-4 in the notification queue 301) to be displayed or if any new notifications (e.g., new notifications 303) have been received. If a new notification has been received, the IANS checks to see if the new notification can be added to the notification queue (e.g., based on maximum number of notifications allowed). In one embodiment, the IANS checks to see if the new notification is a duplicate of an existing notification in notification queue. In one embodiment, the IANS checks to see if the new notification can be combined with an existing notification in the notification queue based different attributes, as discussed in connection with FIG. 3. Further examples of such attributes include information indicating multiple notifications from a single sender and interactions on social media (e.g., responses and comments to a social media post or photo, a "like" relating to a social media post or photo). In one embodiment, the IANS modifies the notification queue and may reorder the notification queue based on a priority of the new notification received.

If there is a notification to be displayed, the state machine transitions to the WAITING TO DISPLAY state S402. In this state, the IANS checks to see if it has appropriate permissions to display the notification and if the user interface is ready. If the appropriate permissions are not available or the user interface is not ready, the IANS remains in the WAITING TO DISPLAY state S402. If it is determined that the IANS has the appropriate permissions and the user interface is ready, the IANS transitions to the DISPLAYING state S403. In one embodiment, permissions are based on user preferences, a system state (e.g., network connectivity) or other parameters controlled by the IANS.

In the DISPLAYING state S403, the IANS performs a process to load the notification to be displayed. The IANS remains in this state until the notification has completely loaded. In response to loading being complete, the IANS transitions to the NOTIFICATION ACTIVE state S404.

In the NOTIFICATION ACTIVE state S404, the notification is active and the IANS waits for the notification to be dismissed. In response to an indication that the notification is to be dismissed, the IANS transitions to the DISMISSING state S405. The notification may be dismissed by the user or automatically dismissed (e.g., after waiting for a certain time period).

In the DISMISSING state S405, the IANS waits for the notification dismissal to be completed. In response to the notification dismissal being complete, the IANS transitions to block S406 where it is determined whether there are notifications in the notification queue. If there is a notification in the notification queue ("YES" at S406), the IANS transitions to the WAITING TO DISPLAY state S402. If there is no notification in the notification queue ("NO" AT S406), the IANS transitions to the IDLE state S401.

Figure 5:
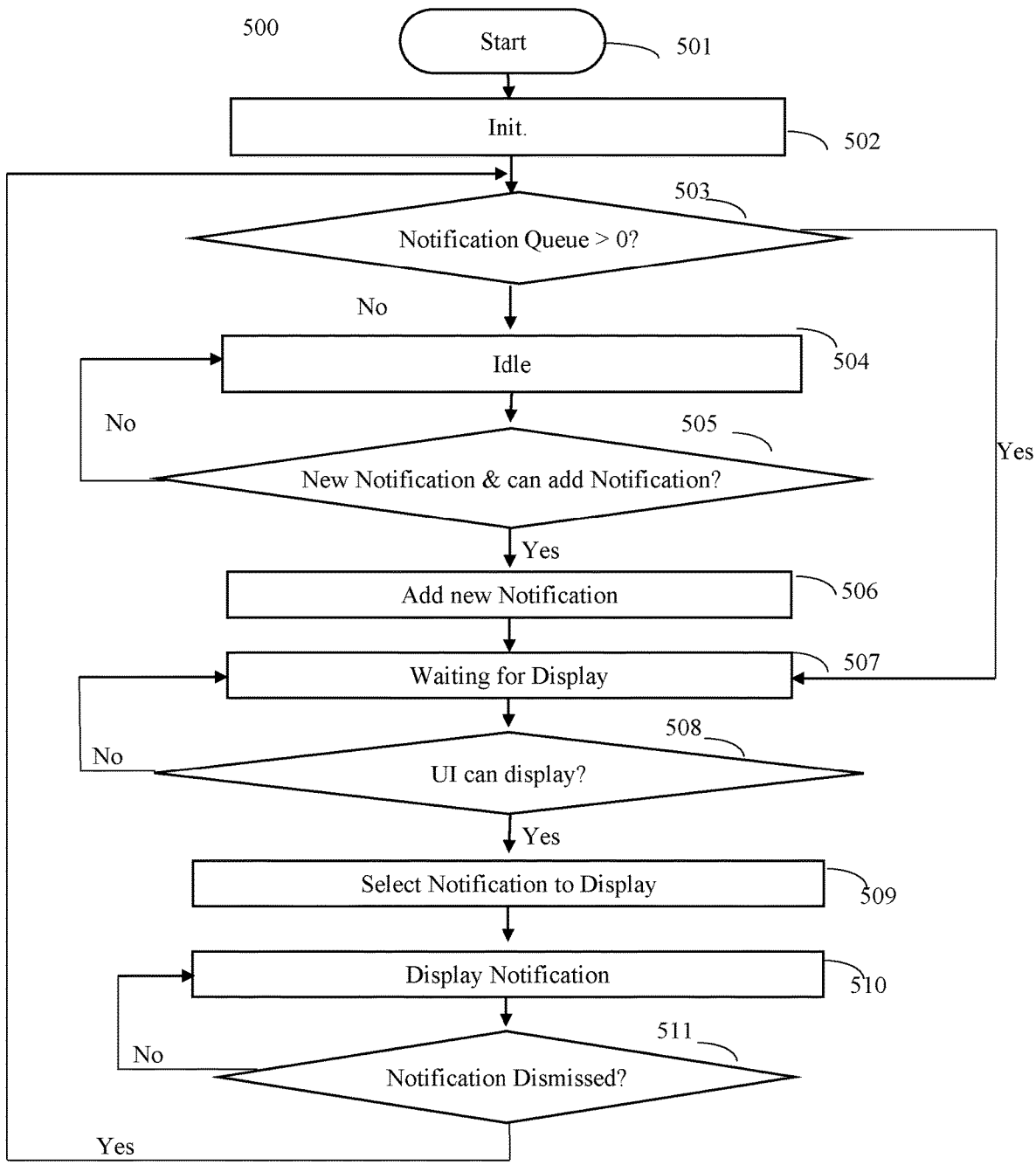
FIG. 5 illustrates a flow chart for explaining a process for notification management according to one example embodiment.

FIG. 5 illustrates a flow chart 500 for explaining a process for notification management according to one example embodiment. In this regard, the following embodiment may be described as a process 500, which is may be depicted as a flowchart, a flow diagram, a structure diagram, or a block diagram. Although the flow chart may describe the operations as a sequential process, many of the operations can be performed in parallel or concurrently. In addition, the order of the operations may be re-arranged. A process is terminated when its operations are completed. A process may correspond to a method, a procedure, etc. Process 500 may be performed by processing logic that includes hardware (e.g. circuitry, dedicated logic, etc.), software (e.g., embodied on a non-transitory computer readable medium), or a combination thereof.

Referring to FIG. 5, the process 500 begins at block 501. At block 502, the TANS is initialized. At block 503, it is determined whether there is a notification in the notification queue. If there is a notification in the notification queue ("Yes" at block 503), the process flows to block 507 where the TANS transitions to the WAITING FOR DISPLAY state (state S402). If there are no notifications in the notification queue ("No" at block 503), the process moves to block 504 where the IANS transitions to the IDLE state (state S401). At block 504, the IANS waits for receipt of a new notification. At block 505, it is determined whether a new notification has been received. If a new notification has been received, it is also determined whether the new notification can be added to the notification queue. Determining whether the new notification can be added to the notification queue may be based on a maximum number of notifications allowed. For example, the maximum number of notifications that can be added to the notification queue may be 2 notifications per minute. As another example, the maximum number of notifications that can be displayed on the user interface may be 2 notifications per minute. If a new notification has not been received ("No" at block 505), the IANS returns to block 504 where the IANS is in the IDLE state S504. If a new notification has been received and can be added to the notification queue ("Yes" at block 505), the process flows to block 506 where the notification is added to the notification queue. At block 506, the IANS may check to see if the new notification is a duplicate of a notification already existing in notification queue. The IANS may also check to see whether the new notification can be combined with an existing notification in the notification queue based on different attributes. In one embodiment, the IANS may modify the notification queue and reorder the notification queue based on a priority of the new notification received. Modification of the notification queue may be based on user input or preference, a system state (e.g., network connectivity) or whether an application is currently in focus to the user (e.g., active).

At block 507, the IANS waits until it has permission to display the new notification. At block 508, it is determined whether the IANS has permission to display the notification on the user interface. If the IANS does not have permission to display the notification ("No" at block 508), the process returns to block 507. If the IANS does have permission to display the notification ("Yes" at block 508), the process moves to block 509 where the IANS selects a notification to display. In one embodiment, at block 509, the IANS selects the next notification to be displayed and loads the notification to be displayed, At block 510, the notification is displayed on the user interface. The IANS remains at block 510 until the notification is dismissed. At block 511, the IANS determines whether the notification has been dismissed. If the notification has been dismissed ("Yes" at block 511), the process moves to block 503. If the notification has not been dismissed ("No at block 511), the process returns to block 510.

In this way, the notification management system provides notifications to a user in a logical and intelligent manner, such that the user is not overwhelmed.

Embodiments herein may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method for notification management, the method comprising:
    filtering, on a communication device, notifications to be displayed on a user interface of the communication device so as to modulate display of the notifications on the user interface, wherein filtering the notifications to be displayed on the user interface of the communication device comprises:
        determining, on the communication device, whether a new notification has been received by the communication device from an external server, wherein the new notification is generated by the external server for remote display on the user interface of the communication device, in response to determining that the new notification has been received, determining, on the communication device, whether the new notification can be added to a notification queue based on a maximum number of notifications allowed within a period of time, wherein the notification queue stores one or more existing notifications, in response to determining that the new notification can be added, adding, on the communication device, the new notification to the notification queue, and modifying, on the communication device, the notification queue, wherein modifying the notification queue comprises:
  determining whether the new notification can be combined with an existing notification in the notification queue based on a user preference, a system state, and whether an application to which the notification is related is currently active, and
  in response to determining that the new notification can be combined, combining the new notification with the existing notification; and displaying, on the user interface, one of the notifications stored in the notification queue based on the modification of the notification queue.

2. The method of claim 1 wherein the maximum number of notifications comprises a maximum number of notifications authorized to be added to the notification queue in the period of time.

3. The method of claim 1 wherein the maximum number of notifications comprises a maximum number of notifications authorized to be displayed on the user interface in the period of time.

4. The method of claim 1 wherein
modifying the notification queue is further based on a user input;
displaying the one of the notifications stored in the notification queue comprises:
  determining, on the communication device, whether there is permission to display the notifications on the user interface, and
  in response to determining that there is permission to display the notifications, displaying, on the user interface, the one of the notifications stored in the notification queue based on the modification of the notification queue.

5. The method of claim 1 wherein modifying the notification queue further comprises: determining whether the new notification is a duplicate of the existing notification in the notification queue, and in response to determining that the new notification is a duplicate, removing the new notification from the notification queue.

6. The method of claim 1 wherein
determining whether the new notification can be combined with the existing notification in the notification queue is further based on a user input.

7. The method of claim 1 wherein modifying the notification queue further comprises reordering an order of the notifications in the notification queue based on a priority of the new notification.

8. The method of claim 1 wherein modifying the notification queue further comprises altering one or more of the notifications in the notification queue based on one or more of the following: an attribute, a user input, the user preference, the system state, or whether the application to which the notification is related is currently active.

9. The method of claim 1 further comprising using a state machine to transition between one or more of the following states: idle, waiting to display, displaying, notification active and dismissing.

10. A communication device including a notification management system, the communication device comprising:
a processor; and
a memory storage storing instructions that, when executed by the processor, cause the processor to:
  filter notifications to be displayed on a user interface of the communication device so as to modulate display of the notifications on the user interface, wherein to filter the notifications to be displayed on the user interface of the communication device, the instructions, when executed by the processor, cause the processor to:
    determine whether a new notification has been received by the communication device from an external server, wherein the new notification is generated by the external server for remote display on the user interface of the communication device,
    in response to determining that the new notification has been received, determine whether the new notification can be added to a notification queue based on a maximum number of notifications allowed within a period of time,
    in response to determining that the new notification can be added, add the new notification to the notification queue, and
    modify the notification queue, wherein to modify the notification queue, the instructions, when executed by the processor, cause the processor to:
      determine whether the new notification can be combined with an existing notification in the notification queue based on a user preference, a system state, and whether an application to which the notification is related is currently active, and
      in response to determining that the new notification can be combined, combine the new notification with the existing notification; and
    display, on the user interface, one of the notifications stored in the notification queue based on the modification of the notification queue.

11. The communication device of claim 10 wherein the maximum number of notifications comprises a maximum number of notifications authorized to be added to the notification queue in a period of time.

12. The communication device of claim 10 wherein the maximum number of notifications comprises a maximum number of notifications authorized to be displayed on the user interface in a period of time.

13. The communication device of claim 10 wherein modifying the notification queue is further based on a user input;
to display the one of the notifications stored in the notification queue, the instructions, when executed by the processor, cause the processor to:
  determine whether there is permission to display the notifications on the user interface, and
  in response to determining that there is permission to display the notifications, display, on the user interface, the one of the notifications stored in the notification queue based on the modification of the notification queue.

14. The communication device of claim 10 wherein to modify the notification queue, the instructions, when executed by the processor, further cause the processor to:

determine whether the new notification is a duplicate of the existing notification in the notification queue, and in response to determining that the new notification is a duplicate, remove the new notification from the notification queue.

15. The communication device of claim 10 wherein determining whether the new notification can be combined with the existing notification in the notification queue is further based on a user input.

16. The communication device of claim 10 wherein to modify the notification queue, the instructions, when executed by the processor, further cause the processor to reorder an order of the notifications in the notification queue based on a priority of the new notification.

17. The communication device of claim 10 wherein to modify the notification queue, the instructions, when executed by the processor, further cause the processor to alter one or more of the notifications in the notification queue based on one or more of the following: an attribute, a user input, the user preference, the system state, or whether the application to which the notification is related is currently active.

18. The communication device of claim 10 wherein the instructions, when executed by the processor, further cause the processor to use a state machine to transition between one or more of the following states:
idle, waiting to display, displaying, notification active and dismissing.

19. A non-transitory computer-readable medium having stored thereon instructions that, when executed by a processor, causes the processor to perform a method for notification management, the method comprising:
filtering, on a communication device, notifications to be displayed on a user interface of the communication device so as to modulate display of the notifications on the user interface, wherein filtering the notifications to be displayed on the user interface of the communication device comprises:
determining, on the communication device, whether a new notification has been received by the communication device from an external server, wherein the new notification is generated by the external server for remote display on the user interface of the communication device,
in response to determining that the new notification has been received, determining, on the communication device, whether the new notification can be added to a notification queue based on a maximum number of notifications allowed within a period of time, wherein the notification queue stores one or more existing notifications,
in response to determining that the new notification can be added, adding, on the communication device the new notification to the notification queue, and
modifying, on the communication device, the notification queue, wherein modifying the notification queue comprises:
determining whether the new notification can be combined with an existing notification in the notification queue based on a user preference, a system state, and whether an application to which the notification is related is currently active, and
in response to determining that the new notification can be combined, combining the new notification with the existing notification; and
displaying, on the user interface, one of the notifications stored in the notification queue based on the modification of the notification queue.

20. The non-transitory computer-readable medium of claim 19 wherein the maximum number of notifications comprises a maximum number of notifications authorized to be added to the notification queue in a period of time.

21. The non-transitory computer-readable medium of claim 19 wherein the maximum number of notifications comprises a maximum number of notifications authorized to be displayed on the user interface in a period of time.

22. The non-transitory computer-readable medium of claim 19 wherein
modifying the notification queue is further based on a user input;
displaying the one of the notifications stored in the notification queue comprises:
determining, on the communication device, whether there is permission to display the notifications on the user interface, and
in response to determining that there is permission to display the notifications, displaying, on the user interface, the one of the notifications stored in the notification queue based on the modification of the notification queue.

23. The non-transitory computer-readable medium of claim 19 wherein modifying the notification queue further comprises:
determining whether the new notification is a duplicate of the existing notification in the notification queue, and in response to determining that the new notification is a duplicate, removing the new notification from the notification queue.

24. The non-transitory computer-readable medium of claim 19 wherein
determining whether the new notification can be combined with the existing notification in the notification queue is further based on a user input.

25. The non-transitory computer-readable medium of claim 19 wherein modifying the notification queue further comprises reordering an order of the notifications in the notification queue based on a priority of the new notification.

26. The non-transitory computer-readable medium of claim 19 wherein modifying the notification queue further comprises altering one or more of the notifications in the notification queue based on one or more of the following: an attribute, a user input, the user preference, the system state, or whether the application to which the notification is related is currently active.

27. The non-transitory computer-readable medium of claim 19, wherein the method further comprises using a state machine to transition between one or more of the following states: idle, waiting to display, displaying, notification active and dismissing.

* * * * *